(12) United States Patent
Lekov et al.

(10) Patent No.: US 11,815,999 B2
(45) Date of Patent: Nov. 14, 2023

(54) OPTIMIZED ALARM STATE RESTORATION THROUGH CATEGORIZATION

(71) Applicant: VMware, Inc., Palo Alto, CA (US)

(72) Inventors: Georgi Lekov, Sofia (BG); Radoslav Gankov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 170 days.

(21) Appl. No.: 17/456,712

(22) Filed: Nov. 29, 2021

(65) Prior Publication Data

US 2023/0168966 A1 Jun. 1, 2023

(51) Int. Cl.
*G06F 11/14* (2006.01)
*G06F 9/455* (2018.01)
*G06F 16/22* (2019.01)

(52) U.S. Cl.
CPC ...... *G06F 11/1415* (2013.01); *G06F 9/45558* (2013.01); *G06F 16/22* (2019.01); *G06F 9/45541* (2013.01); *G06F 2009/4557* (2013.01); *G06F 2009/45562* (2013.01); *G06F 2009/45595* (2013.01)

(58) Field of Classification Search
CPC .. G06F 11/1415; G06F 16/22; G06F 9/45558; G06F 9/45541; G06F 2009/45562; G06F 2009/4557; G06F 2009/45595
See application file for complete search history.

(56) References Cited

U.S. PATENT DOCUMENTS

| | | | | |
|---|---|---|---|---|
| 7,363,359 B1 * | 4/2008 | Tripathy | ............... | H04L 41/20 709/224 |
| 8,073,721 B1 * | 12/2011 | Lewis | ............. | G06Q 10/06312 709/224 |
| 10,560,309 B1 * | 2/2020 | Chitalia | .................. | H04L 41/40 |
| 10,637,737 B2 * | 4/2020 | Whitner | .................. | H04L 41/12 |
| 10,747,630 B2 * | 8/2020 | Sanakkayala | ......... | G06F 11/203 |
| 11,323,327 B1 * | 5/2022 | Chitalia | ............. | H04L 41/0893 |
| 2002/0022952 A1 * | 2/2002 | Zager | ..................... | H04L 41/22 703/22 |
| 2009/0058631 A1 * | 3/2009 | Wall | ...................... | G08B 21/20 340/517 |
| 2011/0208826 A1 * | 8/2011 | Parello | .................. | H04L 41/069 709/207 |
| 2014/0266673 A1 * | 9/2014 | Mello | ............... | G05B 23/0272 340/506 |
| 2015/0170508 A1 * | 6/2015 | Lvin | .................... | G06F 16/951 340/506 |

(Continued)

*Primary Examiner* — Matthew M Kim
*Assistant Examiner* — Indranil Chowdhury
(74) *Attorney, Agent, or Firm* — Patterson + Sheridan, LLP

(57) ABSTRACT

The disclosure provides an approach for alarm state restoration. Embodiments include determining a plurality of alarm definitions applicable to an inventory of a plurality of entities in a computing environment. Embodiments include assigning each given alarm definition of the plurality of alarm definitions to a given alarm category of a plurality of alarm categories. Embodiments include restoring declared states of the plurality of alarms definition on the inventory based on the assigning, wherein the restoring comprises, for each given alarm category of the plurality of alarm categories, performing a single traversal of the inventory to identify all respective entities of the plurality of entities that correspond to one or more alarm definitions assigned to the given alarm category.

18 Claims, 4 Drawing Sheets

(56) References Cited

U.S. PATENT DOCUMENTS

| | | | |
|---|---|---|---|
| 2016/0285693 A1* | 9/2016 | Finkler | H04L 41/22 |
| 2016/0380832 A1* | 12/2016 | Purushotham | H04L 41/40 |
| | | | 709/226 |
| 2017/0180416 A1* | 6/2017 | Giura | G06F 9/45558 |
| 2017/0366407 A1* | 12/2017 | Spivak | H04L 41/12 |
| 2018/0101395 A1* | 4/2018 | Aleksandrov | G06F 9/5077 |
| 2018/0239658 A1* | 8/2018 | Whitner | G06F 11/3409 |
| 2018/0287856 A1* | 10/2018 | Whitner | H04L 41/12 |
| 2019/0238417 A1* | 8/2019 | Spivak | H04L 41/12 |
| 2020/0042637 A1* | 2/2020 | Wu | G06F 16/319 |
| 2022/0006701 A1* | 1/2022 | Patel | H04L 41/22 |
| 2022/0224586 A1* | 7/2022 | Banka | H04L 41/16 |
| 2022/0329603 A1* | 10/2022 | Gujar | H04L 63/104 |

* cited by examiner

OPTIMIZED ALARM STATE RESTORATION THROUGH CATEGORIZATION

BACKGROUND

A software-defined data center (SDDC) generally comprises a plurality of hosts in communication over a physical network infrastructure. Each host is a physical computer (machine) that may run one or more virtualized endpoints such as virtual machines (VMs), containers, and/or other virtual computing instances (VCIs). In some cases, VCIs are connected to software-defined networks (SDNs), sometimes referred to as logical overlay networks, that may span multiple hosts and are decoupled from the underlying physical network infrastructure.

A management component of an SDDC, such as a virtualization manager, generally maintains a hierarchical inventory of the various physical and virtual entities in the SDDC, such as hosts, host clusters, VCIs, port groups, network entities such as virtual routers and switches, and the like. The management component allows users to define alarms on entities in the inventory, such as to generate a notification when some condition occurs with respect to a given entity. For example, if a user wishes to be notified about an increase of more than a threshold amount in processing resource utilization on a given VCI, then the user may define an alarm on that VCI in the inventory, and an alert may be displayed (e.g., the VCI may turn red in a view of the inventory) in a user interface associated with the management component when the condition occurs.

In some cases an SDDC may include a large number of entities, such as in the thousands, and so it may be impractical for a user to define alarms for each individual entity. As such, the management component allows alarms to be defined on the root folder entity of the inventory, and these alarms are propagated to all applicable child entities. For instance, an alarm defined on the root folder entity may indicate that a notification is to be generated whenever a given condition occurs on any VM, and this alarm may be propagated to all VMs in the inventory.

When the management component starts up, such as after a restart, the declared state of all alarms must be restored. The declared state of alarms refers to the applying of alarm definitions to applicable entities as declared by a user. According to existing techniques, the inventory must be traversed for each alarm definition in order to identify entities for which the alarm should be applied. When a VM alarm was declared on the root folder entity, the restore algorithm traverses down the inventory tree until it reaches the VM leaf entities. The algorithm is alarm aware, meaning that when restoring the declared state of an alarm it takes only the paths in the tree that are relevant to the particular alarm to save time. For example, when restoring a VM alarm, only the host and VM folders will be traversed, while the network and datastore folders will be ignored. Essentially, this is a modified depth-first search (DFS) in a tree. However, because the inventory is traversed for every alarm that needs to be restored, the algorithm can become inefficient as inventories become large. Large inventories may have tens of thousands of entities and multiple levels of nesting (e.g., folders inside folders, resource pools inside resource pool, and the like). Such large inventories generally also have many distinct alarms declared, such as datastore, host, VM, cluster, network, port group, and other types of alarms that apply to different entities and their children. If there are N nodes in the inventory and M number of alarms, the worst case complexity will be O(M×N), which amounts to essentially M number of inventory traversals. In large inventories, these existing techniques for restoring the declared state of alarms has proven to be a time-intensive and resource-intensive problem.

Accordingly, there is a need in the art for improved techniques for restoring the declared state of alarms on inventories of entities in SDDCs.

It should be noted that the information included in the Background section herein is simply meant to provide a reference for the discussion of certain embodiments in the Detailed Description. None of the information included in this Background should be considered as an admission of prior art.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
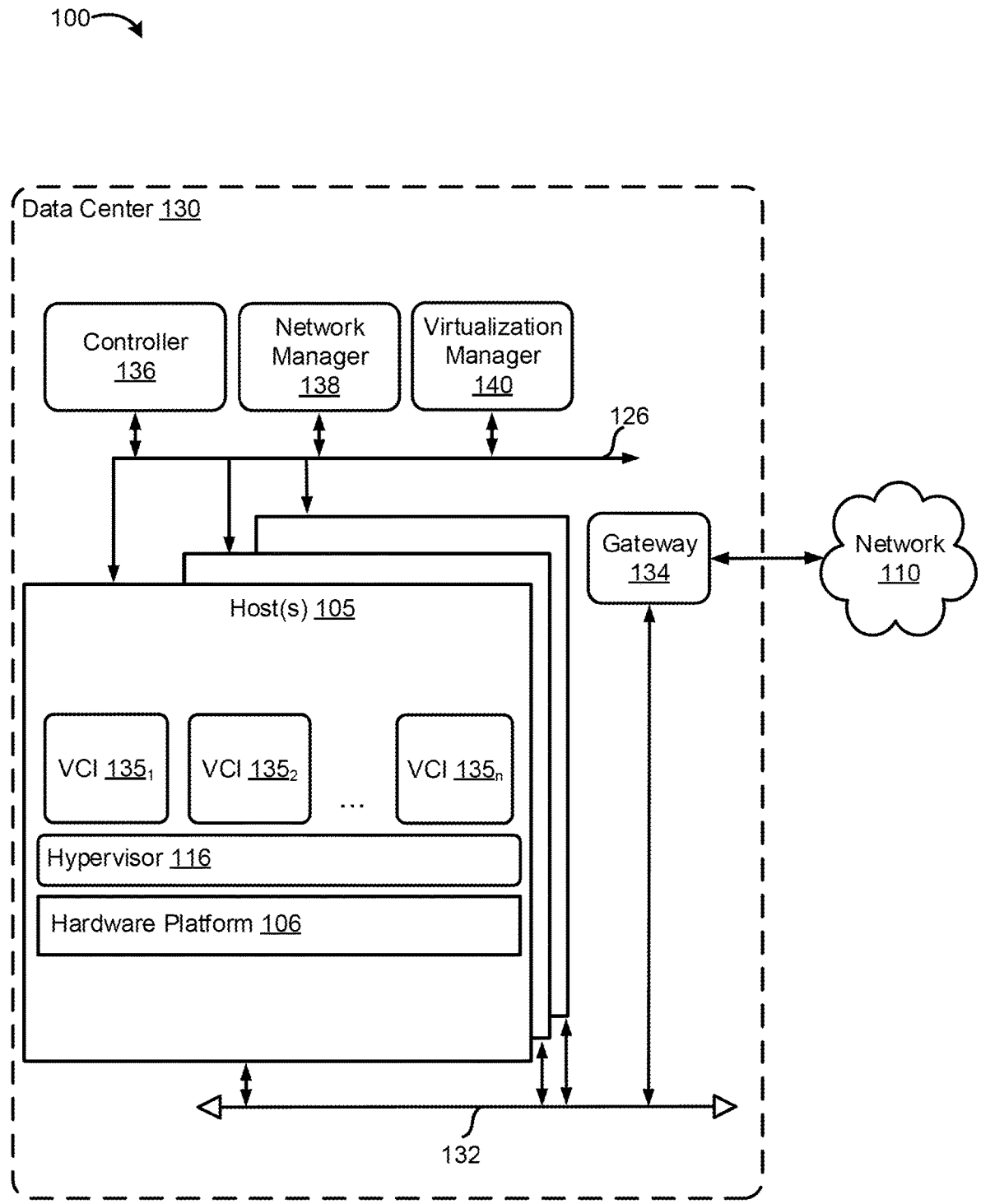
FIG. 1 depicts example physical and virtual network components with which embodiments of the present disclosure may be implemented.

The present disclosure provides an approach for category-based alarm state restoration on an inventory of entities in an SDDC. According to certain embodiments, alarm definitions are categorized and the inventory is traversed only once for each category in order to restore the declared state of all alarm definitions in the category.

For example, upon start-up of a management component of an SDDC, all alarm definitions applicable to the inventory of the SDDC are identified. These alarm definitions are then classified into fixed categories based on attributes of the alarm definitions, such as the type of entity to which each alarm definition applies. In some embodiments, there is a fixed number of categories corresponding to the different types of entities in the inventory (e.g., hosts, VMs, data stores, port groups, clusters, network entities (e.g., switches, routers, and the like), resource pools, storage pods, distributed virtual switches (DVS), and the like), and all alarm definitions that apply to a given type of entity are classified into the category corresponding to that type of entity.

Once the alarm definitions are categorized, the inventory is traversed once for each category in order to identify all entities that correspond to all alarm definitions in that category, and thus the declared states of all such alarms are restored during that single traversal. The traversal may be an alarm-aware depth-first search (DFS) in which only the paths in the inventory tree that are relevant to the particular alarm category are traversed.

While conventional techniques involved traversing the inventory once for every individual alarm, techniques described herein involve traversing the inventory only once for each alarm category, which generally involves a significantly smaller number of traversals. For example, if an inventory includes 10,000 entities and there are 100 alarms, then conventional techniques would involve traversing the inventory 100 times, thereby resulting in potentially one million entities touched. By contrast, embodiments of the present disclosure involve classifying the 100 alarms into a relatively small number of categories. For example, if the 100 alarms include 70 VM alarms and 30 data store alarms, then the 100 alarms will be classified into only two categories, and the inventory will be traversed only twice in order to restore the declared state of all 100 alarms. In such a case, a maximum of 20,000 entities would be touched (e.g., traversing the 10,000 entity inventory twice), which requires significantly less time and processing resources than touching potentially one million entities. Thus, the complexity of the restoration techniques described herein is only O(N), where N is the number of entities in the inventory, since the number of categories is finite and limited to a fixed number. As such, techniques described herein improve upon existing techniques by greatly reducing the computing resources and time required to restore the declared state of alarms on an inventory of SDDC entities.

FIG. 1 depicts example physical and virtual network components with which embodiments of the present disclosure may be implemented.

Networking environment 100 includes data center 130 connected to network 110. Network 110 is generally representative of a network of machines such as a local area network ("LAN") or a wide area network ("WAN"), a network of networks, such as the Internet, or any connection over which data may be transmitted.

Data center 130 generally represents a set of networked machines and may comprise a logical overlay network. Data center 130 includes host(s) 105, a gateway 134, a data network 132, which may be a Layer 3 network, and a management network 126. Host(s) 105 may be an example of machines. Data network 132 and management network 126 may be separate physical networks or different virtual local area networks (VLANs) on the same physical network.

One or more additional data centers (not shown) may be connected to data center 130 via network 110, and may include components similar to those shown and described with respect to data center 130. Communication between the different data centers may be performed via gateways associated with the different data centers.

Each of hosts 105 may include a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 for multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like. VCIs 135 may be an example of machines. For example, a containerized microservice may run on a VCI 135.

In certain aspects, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. It is noted that the term "operating system," as used herein, may refer to a hypervisor. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Gateway 134 provides VCIs 135 and other components in data center 130 with connectivity to network 110, and is used to communicate with destinations external to data center 130 (not shown). Gateway 134 may be implemented as one or more VCIs, physical devices, and/or software modules running within one or more hosts 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Network manager 138 and virtualization manager 140 generally represent components of a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, network manager 138 is a computer program that executes in a central server in networking environment 100, or alternatively, network manager 138 may run in a VM, e.g. in one of hosts 105. Although shown as a single unit, it should be understood that network manager 138 may be implemented as a distributed or clustered system. That is, network manager 138 may include multiple servers or VCIs that implement management functions. Network manager 138 is configured to receive inputs from an administrator or other entity, e.g., via a web interface or API, and carry out administrative tasks for data center 130, including centralized network management and providing an aggregated system view for a user.

In an embodiment, virtualization manager 140 is a computer program that executes in a central server in data center 130 (e.g., the same or a different server than the server on which network manager 138 executes), or alternatively, virtualization manager 140 runs in one of VCIs 135. Virtualization manager 140 is configured to carry out administrative tasks for data center 130, including managing hosts 105, managing VCIs 135 running within each host 105, provisioning VCIs 135, transferring VCIs 135 from one host to another host, transferring VCIs 135 between data centers, transferring application instances between VCIs 135 or between hosts 105, and load balancing among hosts 105 within data center 130. Virtualization manager 140 takes commands from components located on control network 126 as to creation, migration, and deletion decisions of VCIs 135 and application instances on data center 130. However, virtualization manager 140 also makes independent decisions on management of local VCIs 135 and application instances, such as placement of VCIs 135 and application instances between hosts 105. In some embodiments, virtualization manager 140 also includes a migration component that performs migration of VCIs between hosts 105, such as by live migration. According to certain embodiments, virtualization manger 140 maintains a hierarchical inventory of entities in data center 130, and allows a user such as an administrator to define alarms with respect to entities in the inventory. For example, the administrator may interact with a user interface associated with virtualization manager 140 to define alarms with respect to particular entities and/or the root folder entity of the inventory.

In certain embodiments, as described in more detail below with respect to FIGS. 2-4, virtualization manager 140 may, upon starting up, restore the declared state of all alarms using a categorization-based technique. For example, virtualization manager 140 may classify all alarm definitions that are applicable to the inventory into categories (e.g., corresponding to the entity types to which the alarm definitions pertain), and traverse the inventory once using a DFS search technique for each category. Thus, virtualization manager 140 may identify all entities to which alarms in a given category apply in a single traversal, and restore the declared state of all of these alarms accordingly.

Figure 2:
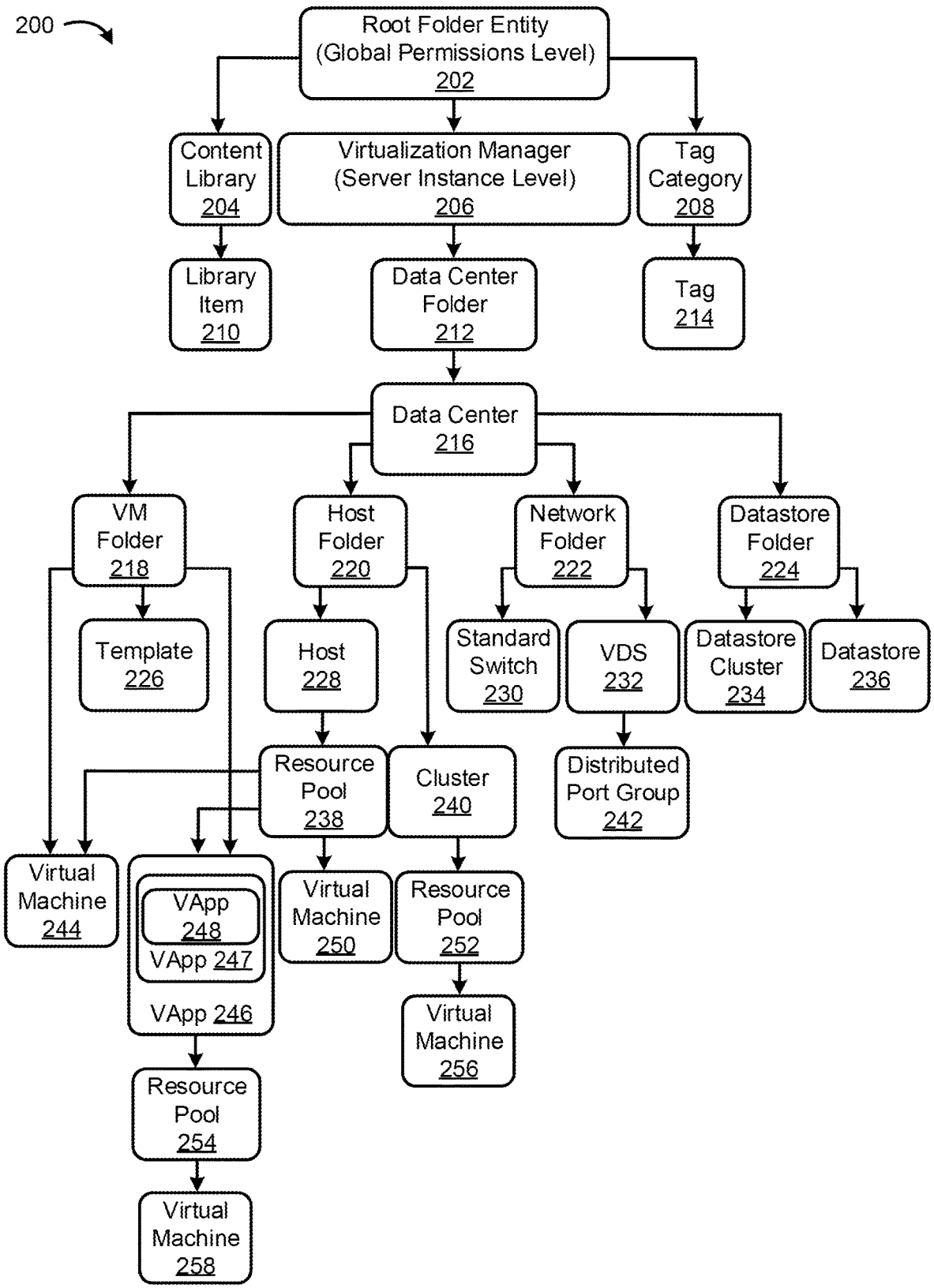
FIG. 2 illustrates an example inventory of an SDDC related to techniques for category-based alarm state restoration.

FIG. 2 is an illustration an example inventory 200 of an SDDC related to techniques for category-based alarm state restoration.

Inventory 200 includes entities with hierarchical relationships, and may represent entities of data center 130 of FIG. 1. In some embodiments, inventory 200 is maintained by virtualization manager 140 of FIG. 1, and alarms may be defined and restored as described herein with respect to entities in inventory 200.

Inventory 200 comprises a root folder entity 202, which serves as a root of the tree. Beneath root folder entity 202 are content library 204, virtualization manager 206, and tag category 208. Beneath content library 204 is library item 210. A content library is generally a container object for storing various object such as VM templates, image files, text files, and the like (e.g., a library item may be any such object). Beneath tag category 208 is a tag 214. A tag is metadata that indicates some attribute of an entity, such as for sorting and searching, and a tag category allows tags to be grouped based on similar attributes.

Beneath virtualization manager 206 (e.g., representing the management component) is a data center folder 212 (e.g., which is the parent entity of all SDDCs managed by the management component). Beneath data center folder 212 is a data center 216 (e.g., representing the SDDC).

Beneath data center 216 are VM folder 218 (e.g., the root entity for all VMs in the SDDC), host folder 220 (e.g., the root entity for all hosts in the SDDC), network folder 222 (e.g., the root entity for all network entities in the SDDC), and data store folder 224 (e.g., the root entity for all data stores in the SDDC).

VM folder 218 includes a template 226 (e.g., a VM template), a VM 244, and a virtual application (VApp) 246 (which includes two nested VApps 247 and 248). A VApp is a program that performs resource management and certain other management activities such as power operations for VMs, and generally operates as a container for VMs. Beneath VApp 248 is a resource pool 254, which is a logical abstraction that represents a pool of computing resources (e.g. processing and memory resources) allocated for one or more VMs. Beneath resource pool 254 is a VM 258.

Host folder 220 includes a host 228 and a cluster 240 (e.g., representing a cluster of hosts). Host 228 includes a resource pool 238, beneath which is VApp 246 (described above) and VM 250. Cluster 240 includes a resource pool 252, beneath which is a VM 256.

Network folder 222 includes a standard switch 230 (e.g., a non-distributed virtual switch) and a virtual distributed switch (VDS) 232. A VDS provides a centralized interface from which VM access switching can be configured and monitored for an SDDC. Beneath VDS 232 is a distributed port group 242. A distributed port group specifies port configuration options for each member port on a VDS (e.g., defining how a connection is made to a network).

Data store folder 224 includes a data store cluster 234 (e.g., a cluster of data stores) and a data store 236 (e.g., a data storage entity such as a database or file system).

As described in more detail below with respect to FIG. 3, alarms may be defined for entities in inventory 200, including alarms defined with respect to root folder entity 202. When the management component starts up, techniques described herein involve a configuration-based process for restoring the declared state of the alarms in which inventory 200 is traversed only once for each alarm category.

Figure 3:
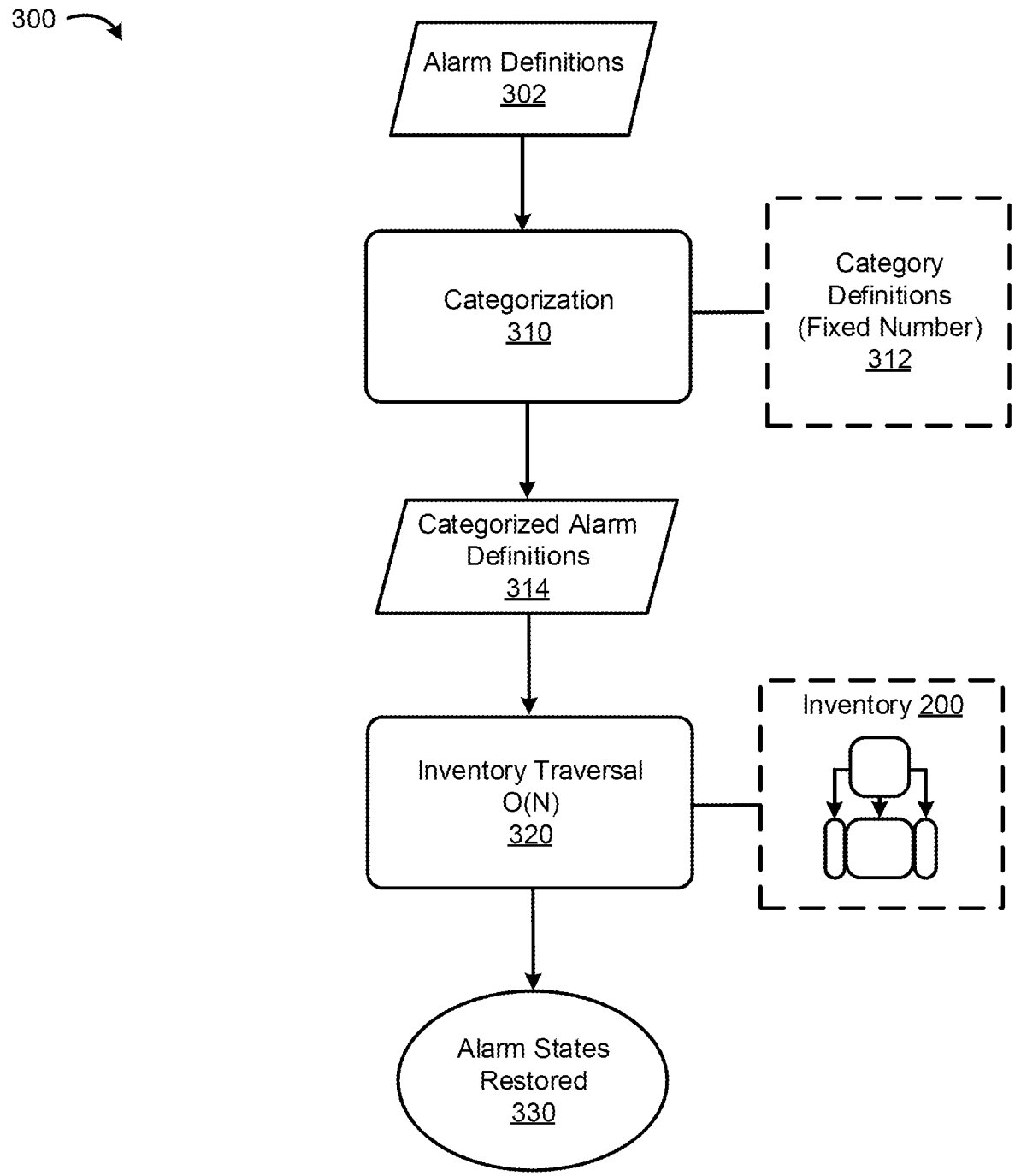
FIG. 3 illustrates an example related to category-based alarm state restoration.

FIG. 3 depicts an illustration 300 of an example related to category-based alarm state restoration.

Alarm definitions 302 include a plurality of definitions of alarms that specify conditions under which notifications should be generated for entities in an SDDC, such as with respect to entities in inventory 200 of FIG. 2. In one example, an alarm definition indicates that a notification is to be generated when processing or memory utilization of any VM exceeds a threshold. In another example, an alarm definition indicates that a notification is to be generated when a name of an SDDC changes. In yet another example, an alarm definition indicates that a notification is to be generated when the available storage capacity of any data store falls below a threshold. In a further example, an alarm definition indicates that a notification is to be generated when a particular port group is connected to by any VM.

Categorization 310 is performed on alarm definitions 302 based on category definitions 312. In some embodiments, category definitions 312 include a fixed number of categories associated with conditions under which alarm definitions are to be classified into each category. Category definitions 312 may include for example, a VM category, a host category, a network category, a port group category, a cluster category, a data store category, a resource pool category, a storage pod category, and/or the like. It is noted that these categories are included as examples, and other categories are possible. Categorization 310 may involve determining the entity type to which each given alarm definition in alarm definitions 302 applies, and classifying the given alarm definition into the category corresponding to that entity type.

Categorized alarm definitions 314 include alarm definitions 302 grouped into categories. Inventory traversal 320 involves performing a single traversal of inventory 200 (e.g., of FIG. 2) for each category in categorized alarm definitions 314. For instance, inventory traversal 320 may involve a DFS of inventory 200 for each category, during which all entities applicable to alarms in a given category are identified. The complexity of inventory traversal 320 is O(N), where N is the number of entities in inventory 200.

Thus, based on inventory traversal 320, the declared states of alarm definitions 302 are restored at 330. For example, all of alarm definitions 302 may be applied to the entities in inventory 200 to which they correspond.

Figure 4:
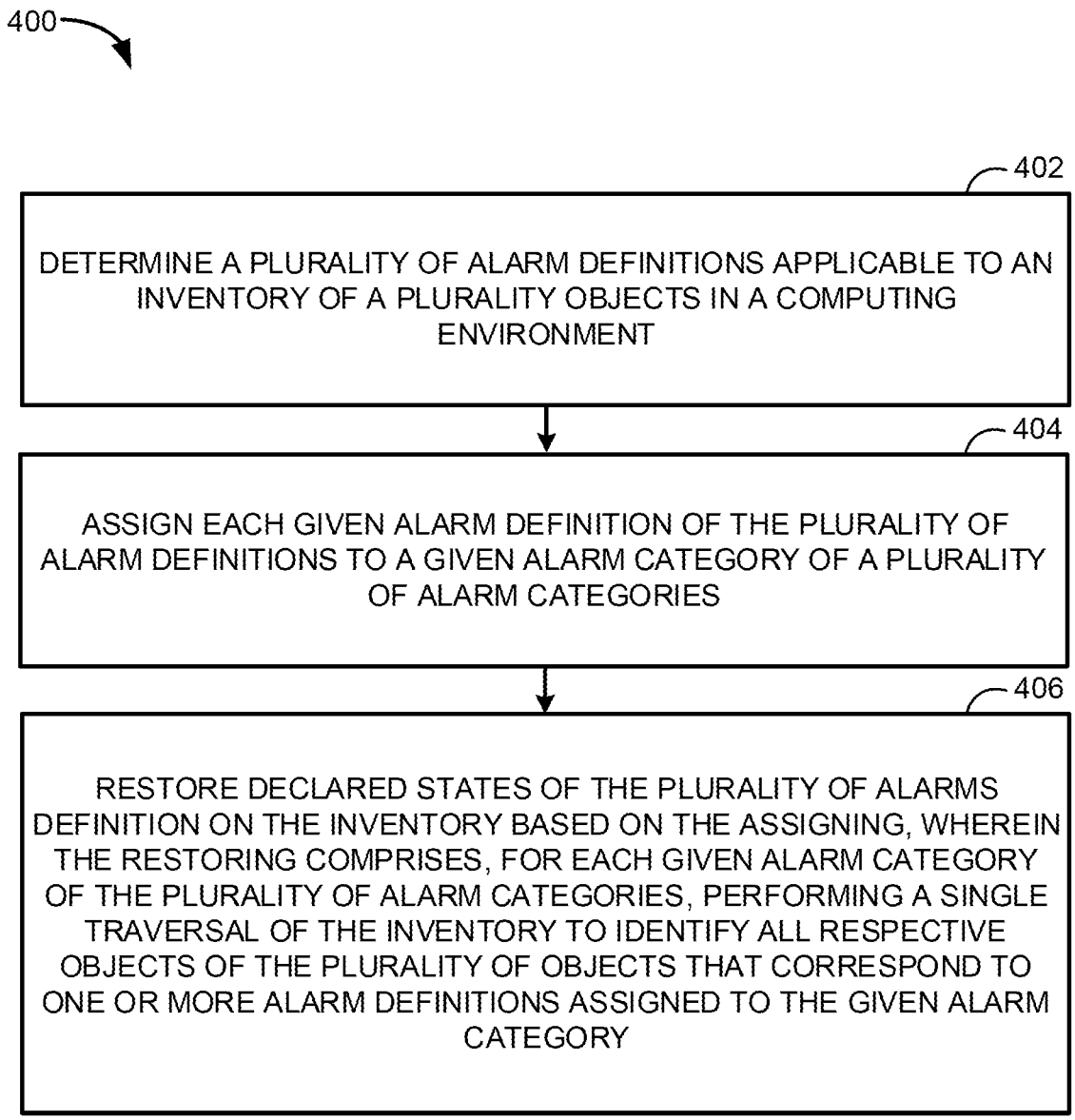
FIG. 4 illustrates example operations related to category-based alarm state restoration.

FIG. 4 illustrates example operations 400 related to category-based alarm state restoration. For example, operations 400 may be performed by virtualization manager 140 of FIG. 1.

Operations 400 begin at step 402, with determining a plurality of alarm definitions applicable to an inventory of a plurality objects in a computing environment.

Operations 400 continue at step 404, with assigning each given alarm definition of the plurality of alarm definitions to a given alarm category of a plurality of alarm categories.

Operations 400 continue at step 406, with restoring declared states of the plurality of alarms definition on the inventory based on the assigning, wherein the restoring comprises, for each given alarm category of the plurality of alarm categories, performing a single traversal of the inventory to identify all respective objects of the plurality of objects that correspond to one or more alarm definitions assigned to the given alarm category.

In some embodiments, assigning each given alarm definition of the plurality of alarm definitions to the given alarm category of the plurality of alarm categories comprises determining that an entity type associated with the given alarm definition corresponds to the given alarm category. In certain embodiments, performing the single traversal of the inventory comprises performing a depth-first search of the inventory for objects corresponding to the one or more alarm definitions assigned to the given alarm category.

In some embodiments, the plurality of alarm definitions comprise one or more alarm definitions that are defined with respect to a root folder entity in the inventory. In certain embodiments, the restoring is performed during a start-up process for a management component associated with the computing environment.

In some embodiments, the plurality of alarm categories comprise one or more of: network alarms; virtual machine alarms; or data store alarms. In certain embodiments, the restoring further comprises transmitting a particular alarm definition of the plurality of alarm definitions to a particular object of the plurality of objects.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of alarm state restoration, comprising:
   determining a plurality of alarm definitions applicable to an inventory of a plurality of entities in a computing environment;
   assigning each given alarm definition of the plurality of alarm definitions to a given alarm category of a plurality of alarm categories; and
   restoring declared states of the plurality of alarm definitions on the inventory based on the assigning, wherein the restoring comprises, for each given alarm category of the plurality of alarm categories, performing a single traversal of the inventory to identify all respective entities of the plurality of entities that correspond to one or more alarm definitions assigned to the given alarm category, wherein the restoring is performed during a start-up process for a management component associated with the computing environment.

2. The method of claim 1, wherein assigning each given alarm definition of the plurality of alarm definitions to the given alarm category of the plurality of alarm categories comprises determining that an entity type associated with the given alarm definition corresponds to the given alarm category.

3. The method of claim 1, wherein performing the single traversal of the inventory comprises performing a depth-first search of the inventory for entities corresponding to the one or more alarm definitions assigned to the given alarm category.

4. The method of claim 3, wherein the inventory comprises a tree structure.

5. The method of claim 1, wherein the plurality of alarm definitions comprise one or more alarm definitions that are defined with respect to a root folder entity in the inventory.

6. The method of claim 1, wherein the plurality of alarm categories comprise one or more of:
   network alarms;
   host alarms;
   virtual machine alarms;
   data store alarms;
   port group alarms;
   cluster alarms; or
   storage pod alarms.

7. The method of claim 1, wherein the restoring further comprises transmitting a particular alarm definition of the plurality of alarm definitions to a particular entity of the plurality of entities.

8. A system for alarm state restoration, the system comprising:
   at least one memory; and
   at least one processor coupled to the at least one memory, the at least one processor and the at least one memory configured to:
      determine a plurality of alarm definitions applicable to an inventory of a plurality of entities in a computing environment;
      assign each given alarm definition of the plurality of alarm definitions to a given alarm category of a plurality of alarm categories; and
      restore declared states of the plurality of alarm definitions on the inventory based on the assigning, wherein the restoring comprises, for each given alarm category of the plurality of alarm categories, performing a single traversal of the inventory to identify all respective entities of the plurality of entities that correspond to one or more alarm definitions assigned to the given alarm category, wherein the restoring is performed during a start-up process for a management component associated with the computing environment.

9. The system of claim 8, wherein assigning each given alarm definition of the plurality of alarm definitions to the given alarm category of the plurality of alarm categories comprises determining that an entity type associated with the given alarm definition corresponds to the given alarm category.

10. The system of claim 8, wherein performing the single traversal of the inventory comprises performing a depth-first search of the inventory for entities corresponding to the one or more alarm definitions assigned to the given alarm category.

11. The system of claim 10, wherein the inventory comprises a tree structure.

12. The system of claim 8, wherein the plurality of alarm definitions comprise one or more alarm definitions that are defined with respect to a root folder entity in the inventory.

13. The system of claim 8, wherein the plurality of alarm categories comprise one or more of:
   network alarms;
   host alarms;
   virtual machine alarms;
   data store alarms;
   port group alarms;
   cluster alarms; or
   storage pod alarms.

14. The system of claim 8, wherein the restoring further comprises transmitting a particular alarm definition of the plurality of alarm definitions to a particular entity of the plurality of entities.

15. A non-transitory computer-readable medium storing instructions that, when executed by one or more processors, cause the one or more processors to:
   determine a plurality of alarm definitions applicable to an inventory of a plurality of entities in a computing environment;

assign each given alarm definition of the plurality of alarm definitions to a given alarm category of a plurality of alarm categories; and restore declared states of the plurality of alarm definitions on the inventory based on the assigning, wherein the restoring comprises, for each given alarm category of the plurality of alarm categories, performing a single traversal of the inventory to identify all respective entities of the plurality of entities that correspond to one or more alarm definitions assigned to the given alarm category, wherein the restoring is performed during a start-up process for a management component associated with the computing environment.

16. The non-transitory computer-readable medium of claim 15, wherein assigning each given alarm definition of the plurality of alarm definitions to the given alarm category of the plurality of alarm categories comprises determining that an entity type associated with the given alarm definition corresponds to the given alarm category.

17. The non-transitory computer-readable medium of claim 15, wherein performing the single traversal of the inventory comprises performing a depth-first search of the inventory for entities corresponding to the one or more alarm definitions assigned to the given alarm category.

18. The non-transitory computer-readable medium of claim 17, wherein the inventory comprises a tree structure.

* * * * *